(12) United States Patent
Miyata et al.

(10) Patent No.: US 6,261,200 B1
(45) Date of Patent: Jul. 17, 2001

(54) CONTINUOUSLY VARIABLE TRANSMISSION

(75) Inventors: Shinji Miyata; Takashi Imanishi, both of Kanagawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/526,923

(22) Filed: Mar. 16, 2000

Related U.S. Application Data

(63) Continuation-in-part of application No. 09/165,994, filed on Oct. 2, 1998, now Pat. No. 6,074,320.

(30) Foreign Application Priority Data

Oct. 2, 1997 (JP) .................................................. 9-269817

(51) Int. Cl.[7] .................................................. F16H 37/02
(52) U.S. Cl. .......................................... 475/186; 475/192
(58) Field of Search ....................................... 475/186, 192

(56) References Cited

U.S. PATENT DOCUMENTS

| | | | |
|---|---|---|---|
| 5,090,951 | 2/1992 | Greenwood | 475/216 |
| 5,178,043 | 1/1993 | Nakano | 475/132 |
| 5,238,460 * | 8/1993 | Esaki et al. | 475/192 |
| 5,669,845 | 9/1997 | Muramoto et al. | 475/192 |
| 5,674,145 | 10/1997 | Kidokoro et al. | 475/192 |
| 5,888,160 * | 3/1999 | Miyata et al. | 475/216 |
| 6,074,320 * | 6/2000 | Miyata et al. | 475/192 |
| 6,171,210 * | 1/2001 | Miyata et al. | 475/216 |

FOREIGN PATENT DOCUMENTS

| | | |
|---|---|---|
| 41 07 739 | 9/1991 | (DE) . |
| 1-169169 | 7/1989 | (JP) . |
| 01312265 * | 12/1989 | (JP) . |
| 1-312266 | 12/1989 | (JP) . |
| 6-21625 | 3/1994 | (JP) . |
| 7-96901 | 10/1995 | (JP) . |
| 9-89071 | 3/1997 | (JP) . |
| 9-210191 | 8/1997 | (JP) . |
| 10267116 * | 10/1998 | (JP) . |
| 11108147 * | 4/1999 | (JP) . |
| WO 91/08406 | 6/1991 | (WO) . |

OTHER PUBLICATIONS

"The Design and Development of an Experimental Traction Drive CVT for a 2.0 Litre FWD Passenger Car", Fellows et al., SAE Technical Paper Series, International Congress & Exposition Detroit, Michigan Feb. 25, 1991–Mar. 1, 1991; pp. 9–19.

* cited by examiner

*Primary Examiner*—Dirk Wright
(74) *Attorney, Agent, or Firm*—Sughrue, Mion, Zinn, Macpeak & Seas, PLLC

(57) ABSTRACT

In a continuously variable transmission comprising: an input shaft which is rotated by a drive source; an output shaft which takes out a driving force attributing the rotation of the input shaft; and a variator and a planet gear mechanism which are arranged between the input shaft and the output shaft, the variator having a clutch which provides a first mode in which a driving force circulation is carried out, and a second mode in which the driving force circulation is not carried out, the speed of a first driving force transmitting system which is inputted to the planet gear mechanism through the variator and the speed of a second driving force transmitting system which is inputted to the planet gear mechanism directly, not through the variator are detected with first and second speed detecting sensors, and, upon detection of the substantial coincidence in the ratio of speed of the first and second driving force transmitting shafts, the mode switching operation is carried out with the clutches.

6 Claims, 7 Drawing Sheets

CONTINUOUSLY VARIABLE TRANSMISSION

This is a Continuation-in-Part of application Ser. No. 09/165,994 filed Oct. 2, 1998 now U.S. Pat. No. 6,074,320, which is incorporated herein by reference in its entirety.

BACKGROUND OF THE INVENTION

1. Field of the Invention

This invention relates to a continuously variable transmission which is employed as a transmission of an automobile or the like.

2. Description of the Related Art

A troidal-type continuously variable transmission employed as a vehicle transmission or the like has been disclosed, for instance, by Japanese Patent Publications Nos. Hei. 6-506042 and Hei. 1-169169. Each of those continuously variable transmissions has an input shaft which is rotated by a drive source, an output shaft which outputs a driving force attributing to the rotation of the input shaft; a speed ratio changing device, namely, a variator which is arranged between the input shaft and the output shaft, and a planet gear mechanism.

What is disclosed in Japanese Patent Publication No. Hei. 6-506042 is a gear neutral system which performs driving force circulation in a low speed mode. Its planet gear mechanism has a low speed clutch and a high speed clutch. When the low speed clutch is connected, and the high speed clutch is disconnected (released), the driving force is transmitted from the planet gear mechanism to the output shaft, and a part of the driving force is transmitted to the variator.

On the other hand, what is disclosed by Japanese Patent Publication No. Hei. 1-169169 is a power split system which perform driving force circulation in a high speed mode. Its planet gear system has a low speed clutch, and a high speed clutch. When the low speed clutch is disconnected while the high speed clutch is connected, the rotational driving force of the input shaft is transmitted to the output shaft directly through the planet gear mechanism (instead of the variator), and a part of the driving force is transmitted to the variator.

That is, in any one of the systems, the low speed clutch and the high speed clutch are provided, and in the case of the mode change, when the rotations in the clutch section are equal to each other, the clutch connection is changed.

However, the conventional troidal-type continuously variable transmission has no means which confirms whether or not a first power transmitting system which is inputted to the planet gear mechanism through the variator is equal in the number of revolutions to a second power transmitting system which is inputted directly (not through the variator) to the planet gear mechanism. In addition, even when a predetermined change gear ratio is not reached, or the gear change is over, or the gear change becomes impossible because the variator becomes out of order, the clutch is changed. Therefore, the clutch is not connected, or damaged. Furthermore, if the clutch is changed when the numbers of revolutions are different, then a gear change shock occurs, which makes the driver or other persons on the vehicle feel bad.

SUMMARY OF THE INVENTION

In view of the foregoing, an object of the invention is to provide continuously variable transmission with which the clutch change is achieved smoothly in the case of mode change, and the damage of the clutch board is prevented, and the gear change shock, which otherwise may be applied to the driver and other persons on the vehicle, is prevented.

The foregoing object of the invention has been achieved by the provision of a continuously variable transmission comprising: an input shaft rotated by a drive source; an output shaft for taking out a driving force attributing a rotation of the input shaft; a variator being arranged between the input shaft and the output shaft; a planet gear mechanism arranged between the input shaft and the output shaft; a switching member for switching a first mode in which a driving force circulation through the variator is carried out and a second mode in which a driving force circulation through the variator is not carried out; and detecting member for detecting a ratio of speed of a first driving force transmitting system which is inputted to the planet gear mechanism through the variator, and a ratio of speed of a second driving force transmitting system which is inputted to the planet gear mechanism directly, not through the variator, wherein, when the detecting member detect a substantial coincidence in the ratios of speed of the first and second driving force transmitting systems, the detecting member performs a mode switching operation using the switching member.

With the continuously variable transmission designed as described above, during a low speed traveling operation, the clutch is changed so that the carrier of the planet gear mechanism is connected to the ring gear while the second driving power transmitting system is disconnected from the ring gear. Under this condition, only the variator transmits the driving power from the input shaft to the output shaft. During the high speed traveling operation, the clutch is changed so that the second driving power transmitting system is connected to the ring gear while the carrier is disconnected from the ring gear. In addition, under this condition, the torque is transmitted from the carrier forming the planet gear mechanism to the output disk of the variator through the second driving power transmitting system. Under this condition, the speed change ratio of the continuously variable transmission is, as a whole, changes according to the speed of revolution of the planet gear. Therefore, by changing the speed change ratio of the variator thereby to change the speed or evolution of the planet gear, the speed change ratio of the continuously variable transmission an be adjusted as a whole.

The speed (rpm) of the first driving force transmitting system is detected by the speed ratio detecting member, namely, the first speed detecting sensor, while the speed of the second driving force transmitting system is detected by the second speed detecting sensor, and the detection signals thereof are applied to the control circuit. When the speeds thus detected are equal to each other or substantially equal to each other, the control circuit applies a signal to the drive section of the high speed clutch and the low speed clutch. In response to the instruction signal, the mode change operation is carried out that the high speed clutch is connected while the low speed clutch and the backward clutch are disconnected (released).

DETAILED DESCRIPTION OF THE PREFERRED EMBODIMENTS

Preferred embodiments of the invention will be described with reference to the accompanying drawings.

Figure 1:
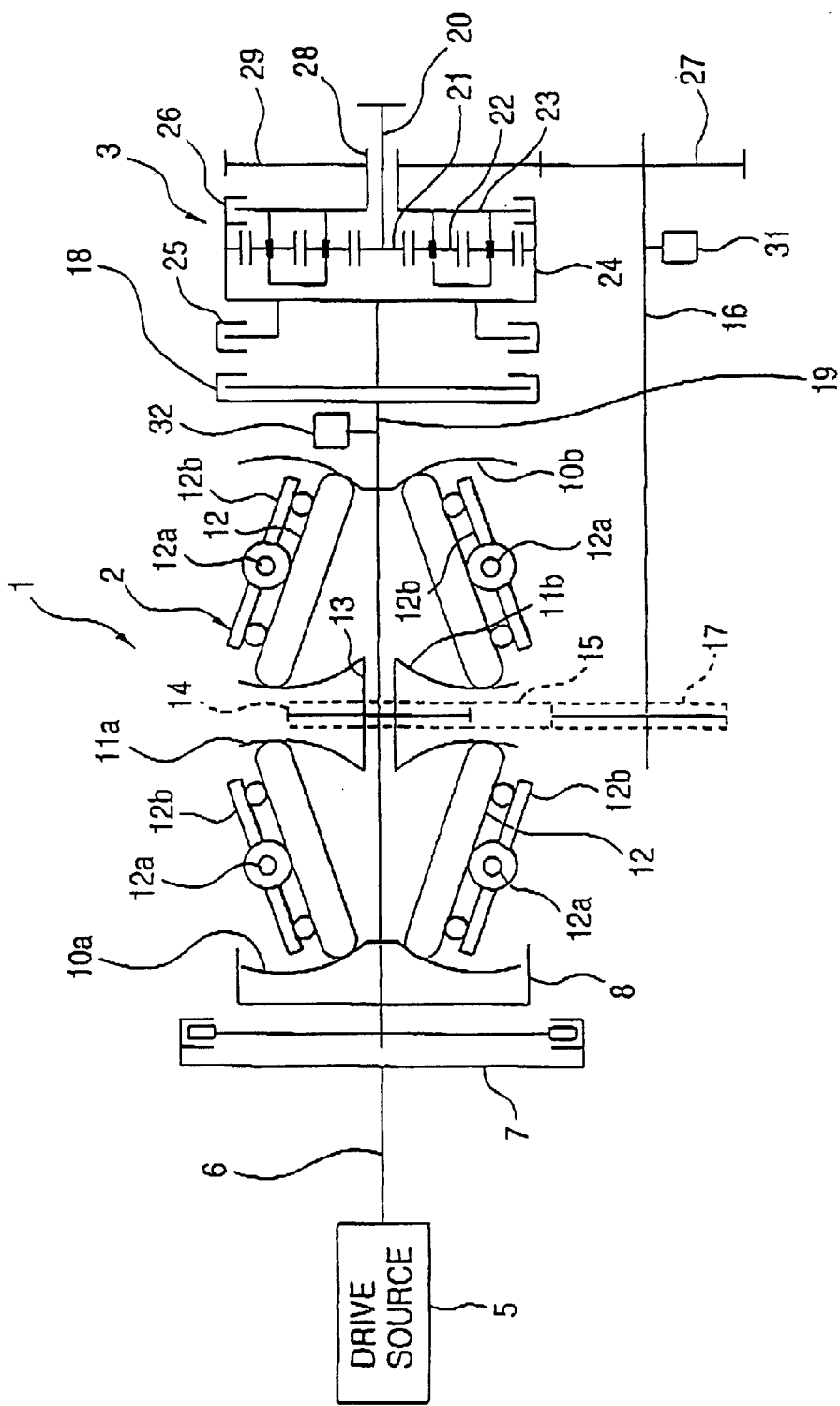
FIG. 1 is a diagram showing a first embodiment of a continuously variable transmission according to the present invention.
Figure 2:
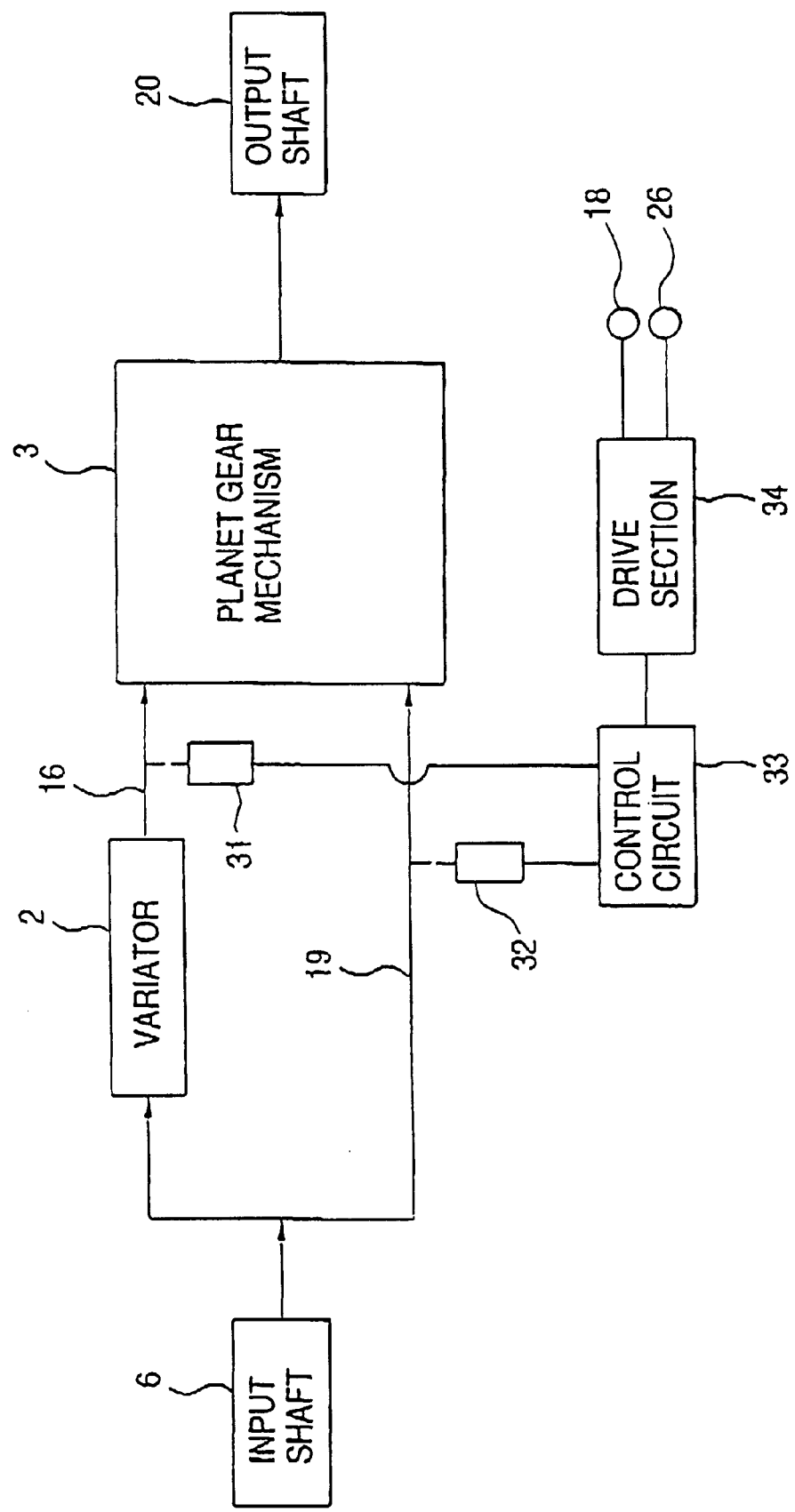
FIG. 2 is a block diagram of the continuously variable transmission shown in FIG. 1.

FIGS. 1 and 2 show a first embodiment of the invention. More specifically, FIG. 1 is a diagram showing the arrangement of a double cavity troidal-type continuously variable transmission, and FIG. 2 is a block diagram thereof. In FIG. 1, reference numeral 1 designates the troidal-type continuously variable transmission, which has a variator 2 and a planet gear mechanism 3. The variator is rotatably supported on a stationary section through bearings or the like, and has an input shaft 6 which is coupled to a drive source 5 such as an engine.

The input shaft 6 has a hydraulic depression mechanism, namely, a hydraulic (oil pressure) piston 8 through a start clutch 7. The hydraulic piston 8 is connected to an oil pressure supply source (not shown), to transmit a desired depression force to the variator 2. The variator 2 has a pair of input disks 10a and 10b which are rotated in association with the input shaft 6 an are confronted with each other. Between the pair of input disks 10a and 10b, a pair of output disks 11a and 11b are coaxially arranged. The output disks 11a and 11b are loosely engaged with the input shaft 6 and turned in synchronization with each other.

Between the input disks 10a and 10b and the output disks 11a and 11b, trunnions 12b are provided so as to be swingable about a support shaft 12a. Each of the trunnions 12b has a plurality of power rollers 12 which are rolled in contact with the input disks 10a and 10b and the output disks 11a and 11b. The output disks 11a and 11b are coupled to each other through a loose engage shaft 13 which is loosely engaged with the input shaft 6. The rotational driving force transmitted to the input shaft 6 of the variator 2 is transmitted to the loose engage shaft 13 through the input disks 10a and 10b, the power roller 12, and the output disks 11a and 11b, and the ratio speed (obtained by dividing the speed of rotation of the output disks 11a and 11b by the speed of rotation of the input disks 10a and 10b) is determined by the swing rotation angle of the power rollers 12.

That is, when the power rollers 12 are horizontal, a neutral state, the ratio of speed is 1, is established, whereby, as the output disk (11a and 11b) sides of the power rollers 12 are swung in such a manner that they move apart from the input shaft 6, the ratio of speed is decreased; on the other hand, as the output disk (11a and 11b) sides of the power rollers are swung in such a manner that they approach the input shaft 6, then the ratio of speed is increased. A first sprocket 14 is mounted on the aforementioned loosely engaged shaft 13. The first sprocket 14 is operated through a chain 15 in association with a second sprocket 17 which is provided on a first driving power transmitting shaft 16 which forms a first driving power transmitting system. On the other hand, on the other end of the input shaft 6, a second driving power transmitting shaft 19 is provided through a high speed clutch 18. The second driving power transmitting shaft 19 forms a second driving power transmitting system in association with the planet gear mechanism 3.

The planet gear mechanism 3 will be described in more detail. The planet gear mechanism 3 has a sun gear 21 having an output shaft 20; a plurality of planet gears 22 engaged with the sun gear 21, a carrier 23 engaging with the planet gears 22, and a ring gear 24 engaged with the planet gears 22. The ring gear 24 is coupled to the high speed clutch 18 through the second driving power transmitting shaft 19. Between the ring gear 24, and the housing (not shown) of the planet gear mechanism 3, a backward clutch 25 is provided which allows and restricts the rotation of the ring gear 24. Furthermore, between the carrier 23 and the ring gear 24, a low speed clutch 26 is provided which permits and prohibits the transmission of the driving power.

A first gear 27 is mounted on the other end of the first driving power transmitting shaft 16 which form the aforementioned first driving power transmitting system, and the carrier 23 of the planet gear mechanism 3 has a loosely engaged shaft 28 which is loosely engaged with the output shaft 20. The loosely engaged shaft 28 has a second gear 29 which is engaged with the first gear 27.

A first speed (rpm) detecting sensor 31 adapted to detect the number of revolutions of the first driving power transmitting shaft 16 is provided at the middle of the first driving power transmitting shaft 16 which forms the aforementioned first drive power transmitting system. A second speed (rpm) detecting sensor 32 adapted to detect the number of revolutions of the second driving power transmitting shaft 19 is provided at the middle of the second driving power transmitting shaft 19 which forms the aforementioned second driving power transmitting system. The first and second speed detecting sensors are potentiometers, Hall elements, or MR elements. The detection signals are applied to a control circuit 33, where the ratio of speed (rpm) of the first driving power transmitting shaft 16 and the second driving power transmitting shaft 19 is obtained. The control circuit 33 is electrically connected to the drive section of a high speed clutch 18 and a low speed clutch 26, so that the connection and disconnection of the clutch are carried out in response to the output signal of the control circuit 33.

The rpm of the first driving power transmitting shaft 16 is detected with the first speed detecting sensor 31, and the rpm of the second driving power transmitting shaft 19 is detected with the second speed detecting sensor 32. Only when those speeds (rpm) are equal to each other or substantially equal to each other, the control circuit 33 applies signals to the drive sections of the high speed clutch 18 and the low speed clutch 26, so that the mode change is carried out.

Now, the operation of the first embodiment will be described.

It is assumed that the input shaft 6 is stopped, the variator 2 is at the maximum speed reduction position, and the high speed clutch 18, the low speed clutch 26, and the backward clutch 25 are released. When, under this condition, the start clutch 7 is connected, and the input shaft 6 is turned in a predetermined direction by the drive source 5, in association with the rotation of the input shaft 6 the input disks 10a and 10b of the variator 2 are turned at the same speed in the same direction. In this case, the power rollers 12 are at the maximum speed reduction position, so that the rotation of the input disks 10a and 10b are transmitted through the power rollers 12 to the output disks 11a and 11b in such a manner that they turn in the direction opposite to the direction of the rotation of the input disk 10a and 10b and are lower in speed than the input shaft 6.

Accordingly, the loosely engaged shaft 13 is turned, the rotation of the loosely engaged shaft 13 is transmitted to the first sprocket 14, the chain 15, and the second sprocket 17, so that the second gear 29 is also turned through the first driving power transmitting shaft 16 an through the first gear 27. However, under this condition, the high speed clutch 18, the low speed clutch 26, and the backward clutch 25 are released, and the planet gear 22 and the carrier 23 are fully turned, and furthermore the force of rotation thereof is not transmitted to the sun gear 21 coupled to the output shaft 20; that is, the output shaft 20 is kept stopped.

When, with the output shaft 20 kept stopped, the start clutch 7 is connected, and in response to the instruction signal from the control circuit 33, the low speed clutch 26 is connected while the high speed clutch 18 and the backward clutch 25 are disconnected (released), then the carrier 23 is coupled to the ring gear 24, so that the force of rotation of the second gear 29 is transmitted to the loosely engaged shaft 28, the carrier 23, and the ring gear 24. Hence, the sun gear 21 is rotated through the planet gear 22, and the force of rotation of the sun gear is transmitted to the output shaft 20. Thus, a first mode (forward mode) is obtained that the output shaft 20 is turned in the same direction as the input shaft 6.

When, while the first mode is maintained, the variator 2 is increased in speed; more specifically, the power rollers 12 are swung in such a manner that the their output disk (11a and 11b) sides approach the input shaft 6, then according to the swing rotation angle, the speed of rotation of the first driving power transmitting shaft 16 is increased, and accordingly the ring gear 24 of the planet gear mechanism 3 and the carrier 23 are increased in the speed of rotation, so that the speed of rotation of the output shaft 20 is increased; that is, the troidal-type continuously variable transmission is increased in the ratio of speed.

In this case, the rpm of the first driving power transmitting shaft 16 is detected by the first speed detecting sensor 31, while the rpm of the second driver power transmitting shaft 19 is detected by the second speed detecting sensor 32, and the detection signals thereof are applied to the control circuit 33. When those speeds (rpm) are equal to each other or substantially equal to each other, the control circuit 33 applies signals to the drive section 34 of the high speed clutch 18 and the low speed clutch 26.

In response to the instruction signal from the control circuit 33, a mode change is carried out that the high speed clutch 18 is connected while the low speed clutch 26 and the backward clutch 25 are released (disconnected). The rotation of the input shaft 6 is transmitted through the high speed clutch 18 to the second driving power transmitting shaft 19, while the rotation of the second driving power transmitting shaft 19 is transmitted to the ring gear 24 of the planet gear mechanism 3. The rotation of the ring gear 24 is transmitted through a plurality of planet gears 22 to the sun gear 21, so that the output shaft 20 coupled to the sun gear 21 is turned. If it is assumed that, in the case where the ring gear 23 is on the input side, the carrier 23 supporting the planet gear 22 is stopped, then a speed increase is carried out with a speed change ratio corresponding to the ratio of teeth of the ring gear 23 and the sun gear 21. However, the planet gear 22 supported by the carrier 23 revolves around the sun gear 21, and the speed change ratio (as a whole continuously variable transmission) changes depending on the revolving speed of the planet gear 22. Hence, if the speed change ratio of the variator 2 is changed to change the revolving speed of the planet gear 22, then the speed change ratio (as a whole continuously variable transmission) can be adjusted.

That is, during the high speed traveling operation, the planet gear 22 revolves in the same direction as the ring gear 24. And, the higher the revolving speed of those planet gear 22, the higher the speed of rotation of the output shaft 20 secured to the sun gear 21. For instance, when the aforementioned revolving speed (angular speed) and the speed of rotation (angular speed) of the ring gear 24 are equal to each other, the speed of rotation of the ring gear 24 becomes equal to that of the output gear 20. On the other hand, if the revolving speed is smaller than the speed of rotation of the ring gear 24, then the speed of rotation of the output shaft 20 becomes larger than that of the ring gear 24. On the other hand, if the revolving speed is larger than the speed of rotation of the ring gear 24, then the speed of rotation of the output shaft 20 becomes smaller than that of the ring gear 24.

Accordingly, during the aforementioned high speed traveling operation, a part of the torque which is transmitted through the second driving power transmitting system to the ring gear 24 of the planet gear mechanism 3 is transmitted from the planet gear 22 to the output disks 11a and 11b through the carrier 23 and the first driving power transmitting system. As the speed change ratio of the variator 2 is changed to decrease the speed, the speed change ratio of the whole troidal-type continuously variable transmission 1 is changed to increase the speed. In this high speed traveling operation, torque is applied to the variator 2 from the output disks 11a and 11b (not from the input disks 10a and 10b); that is, a so-called "driving power circulation state" occurs.

As was described above, the speed (rpm) of the first driving power transmitting shaft 16 is detected with the first speed (rpm) detecting sensor 31, while the speed of the second driving power transmitting shaft 19 is detected with the second speed detecting sensor 32. The detection signals of those sensors are applied to the control circuit 33. When those speeds (rpm) are equal to or substantially equal to each other, the control circuit 33 applies a signal to the drive section 34 of the high speed clutch 18 and the lower speed clutch 26. And, in response to the instruction signal from the control circuit 33, a mode change is carried out that the high speed clutch 18 is connected, while the low speed clutch 26 and the backward clutch 25 are disconnected (released), whereby the clutch connection change can be achieved; that is, the clutch board damage and the speed change shock can be prevented.

Even if, when the speed change signal is outputted, it is impossible to perform the speed change because the variator 2 becomes out of order, by releasing all the clutches the input shaft 6 connected to the engine is disconnected from the output shaft 20 which are coupled to the wheels. Hence, a natural speed decrease, or an abrupt stop can be carried out.

Figure 3:
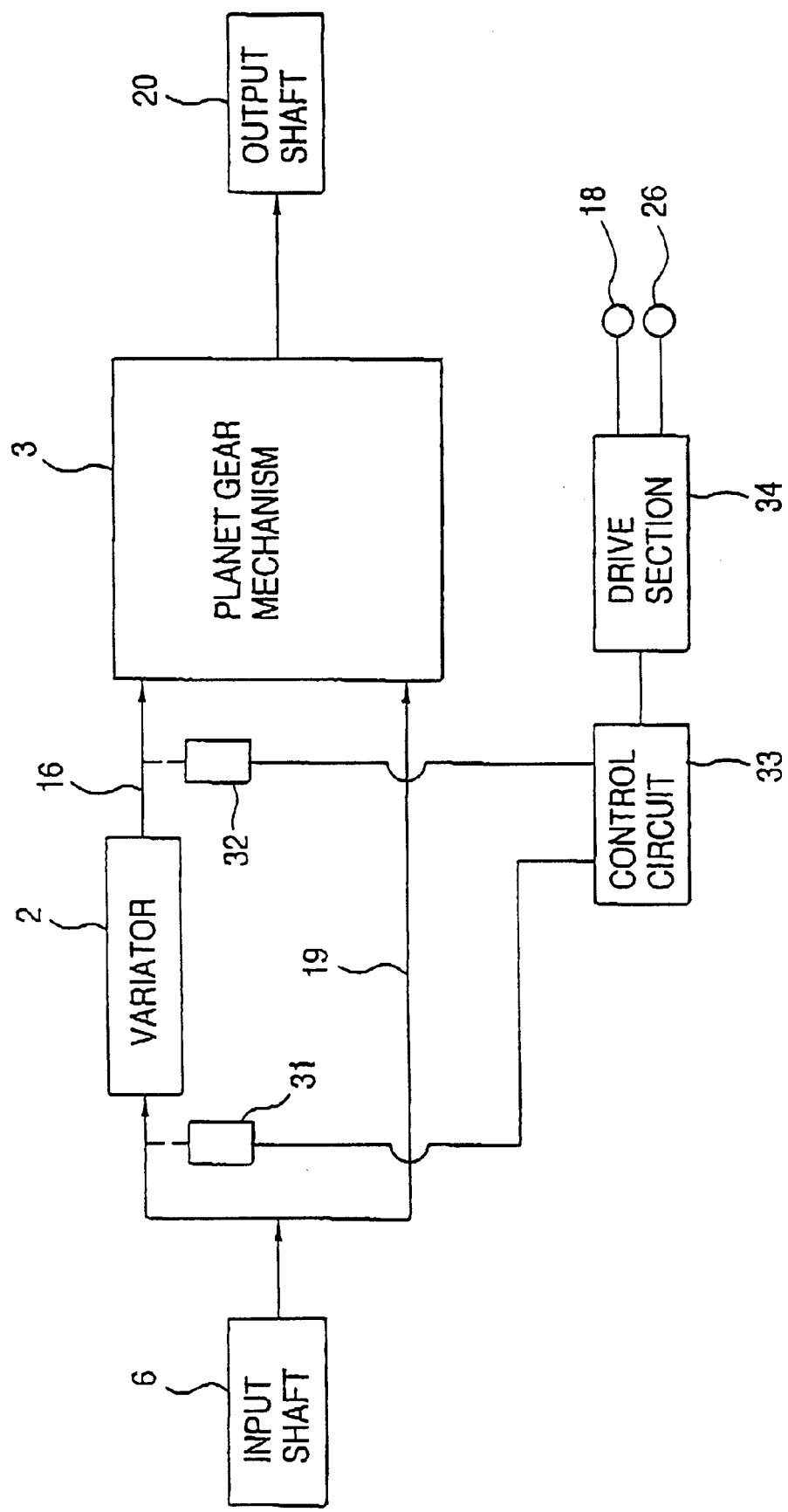
FIG. 3 is a block diagram of a second embodiment of a continuously variable transmission according to the present invention.

FIG. 3 shows a second embodiment of the invention, in which parts corresponding functionally to those already described with reference to the first embodiment are therefore designated by the same reference numerals or characters. A specific feature of the second embodiment resides in that the first speed detecting sensor 31 and the second speed detecting sensor 32 are provided as speed (rpm) ratio detecting member. That is, the first speed detecting sensor 31 detects the speed (rpm) of the input disks 10a and 10b, while the second speed detecting sensor 32 detects the speed of the output disks 11a and 11b. The detection signals thereof are applied to the control circuit 33. When the input and output speeds thus detected are equal to each other or substantially equal to each other, the control circuit 33 applies a signal to the drive section 34 of the high speed clutch 18 and the low speed clutch 26.

In response to the instruction signal from the control circuit 33, the mode change is carried out that the high speed clutch 18 is connected while the low speed clutch 26 and the backward clutch 25 are disconnected (released). Thus, similarly as in the case of the first embodiment, the clutch change operation is carried out smoothly, and the clutch board damage and the speed change shock are positively prevented.

Figure 4:
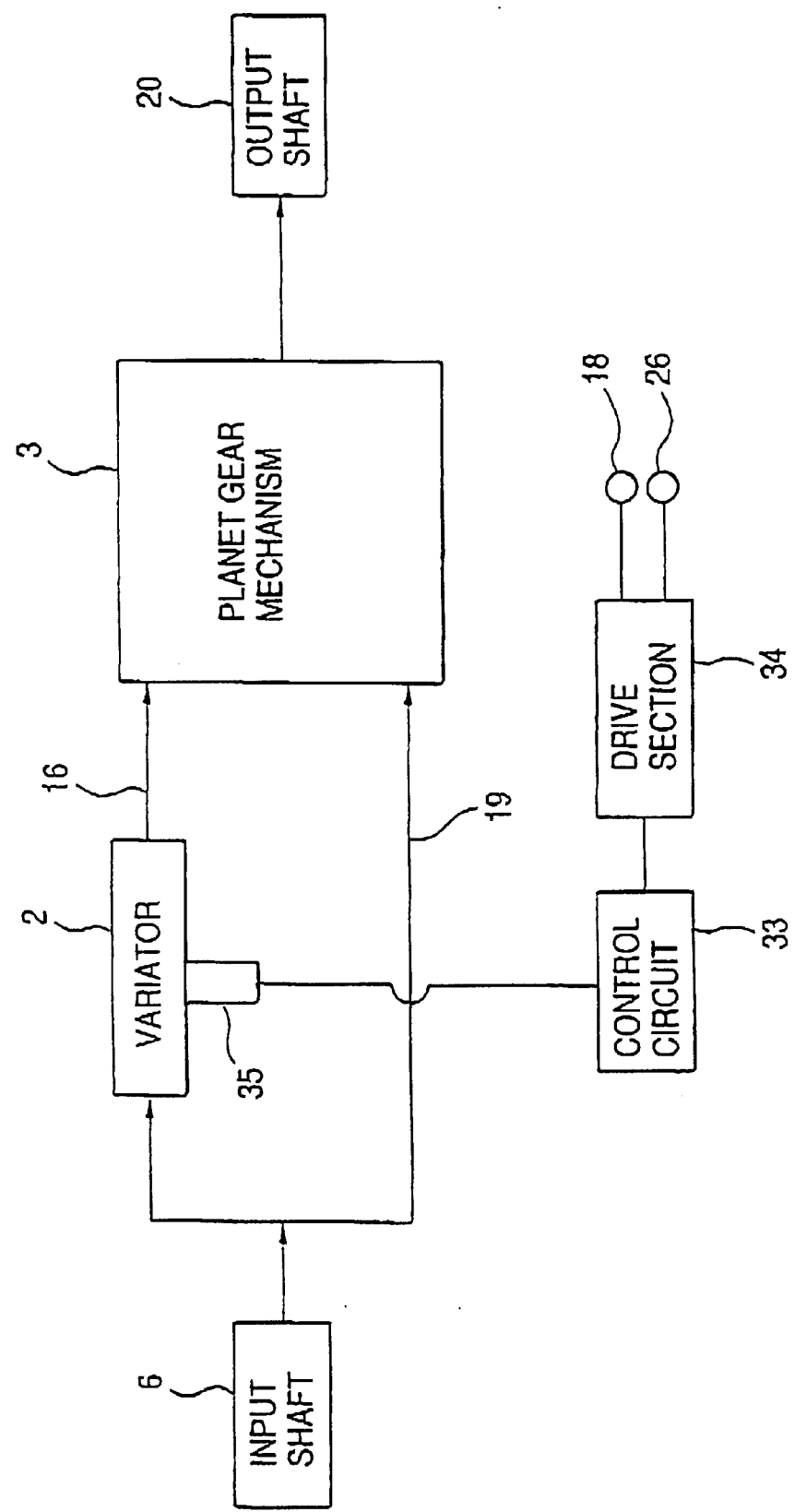
FIG. 4 is a block diagram of a third embodiment of a continuously variable transmission according to the present invention.

FIG. 4 shows a third embodiment of the invention, in which parts corresponding functionally to those already described with reference to the first embodiment are therefore designated by the same reference numerals or characters. In the embodiment, a swing-rotation-angle detecting sensor 35 is provided which measures the swing rotation angle of the trunnion 12b of the variator 2, so that the swing rotation angle of the trunnion 12b is utilized to calculate the speed change ratio of the variator 2; i.e., the input and output speed (rpm) ratio. The detection signal of the swing-rotation-angle detecting sensor 35 is applied to the control circuit 33. When the input speed (rpm) and the output speed (rpm) are equal to each other or substantially equal to each other, the control circuit 33 applies a signal to the drive section 34 of the high speed clutch 18 and the low speed clutch 26.

In response to the instruction signal from the control circuit 33, the mode change is carried out that the high speed clutch 18 is connected while the low speed clutch 26 and the backward clutch 25 are disconnected (released). Similarly as in the case of the first embodiment, the clutch connecting and disconnecting operation is smoothly carried out, and the clutch board damage and the speed change shock can be prevented.

The angle detecting sensor 35 is not always a sensor which electrically or optically detect the swing rotation angle of the trunnion 12b; that is, it may be a mechanism which is coupled to the cam mechanism to mechanically detect the inclination angle of the trunnion 12b, or the unit which is able to detect the speed change ratio of the variator 2.

Figure 5:
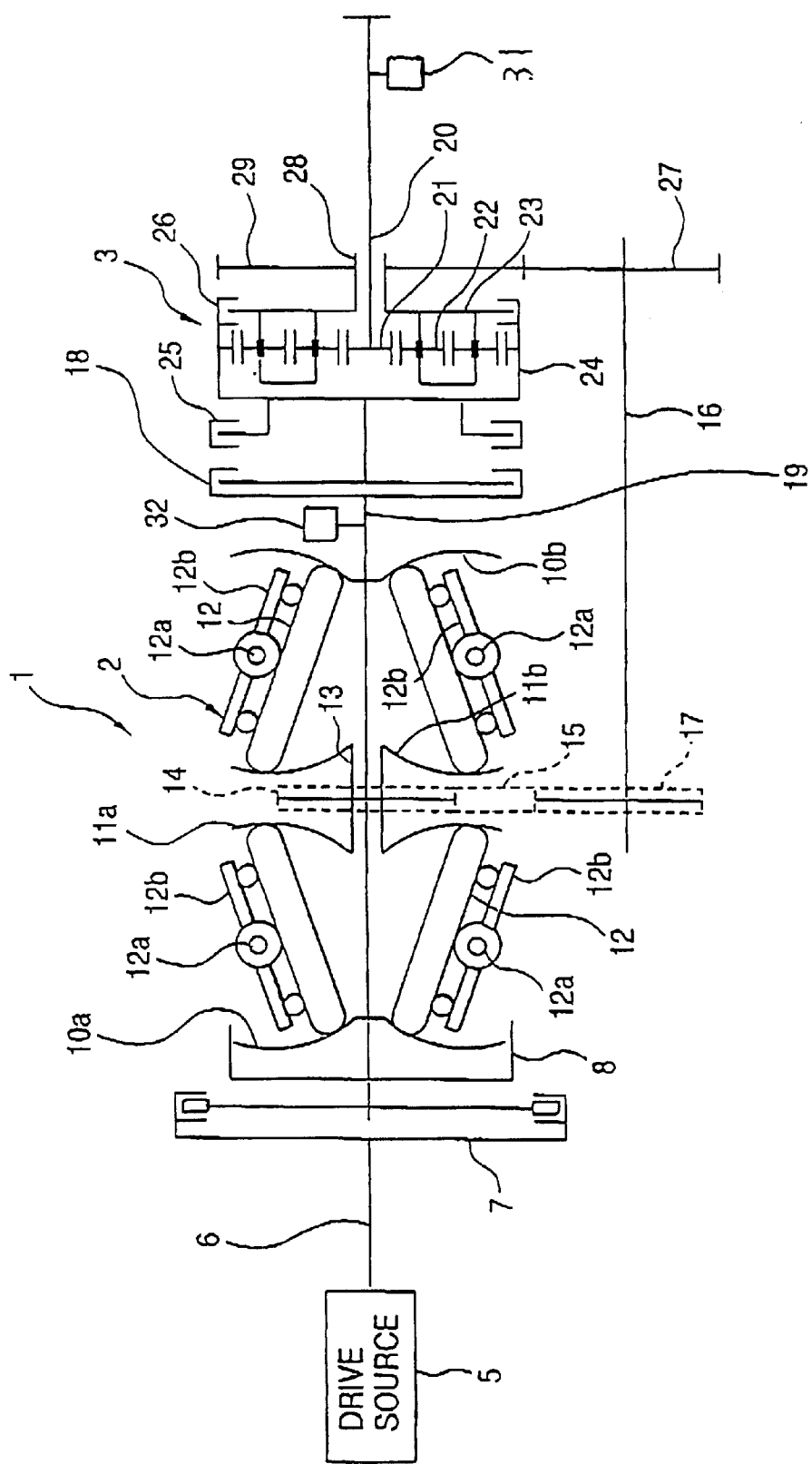
FIG. 5 is a diagram showing a fourth embodiment of a continuously variable transmission according to the present invention.
Figure 6:
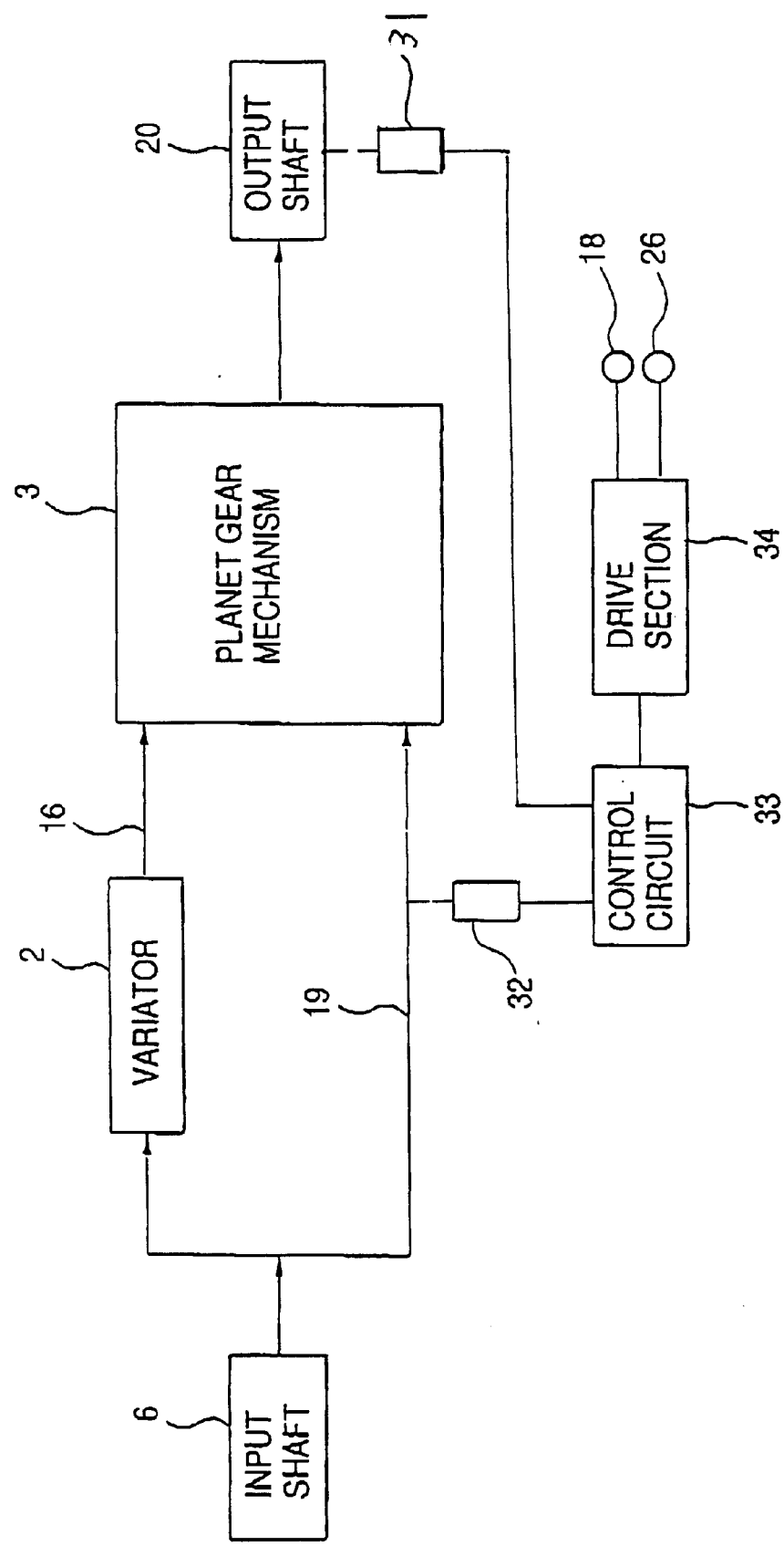
FIG. 6 is a block diagram showing of the continuously variable transmission shown in FIG. 5.

FIGS. 5 and 6 show a fourth embodiment of the invention, in which parts corresponding functionally to those already described with reference to the first embodiment are therefore designated by the same reference numerals or characters. A specific feature of the fourth embodiment resides in that the first speed detecting sensor 31 in the first embodiment are provided at the output shaft 20. Thus, the first speed detecting sensor 31 detects the number of revolutions of the output shaft 20, and the second speed detecting sensor 32 detects the number of revolutions of the second driving power transmitting shaft 19. The detection signals of the first speed detecting sensor 31 and the second speed detecting sensor 32 are applied to the control circuit 33. When those speeds (rpm) are equal to each other or substantially equal to each other, the control circuit 33 applies signals to the drive section 34 of the high speed clutch 18 and the low speed clutch 26, and a mode change is carried out.

Figure 7:
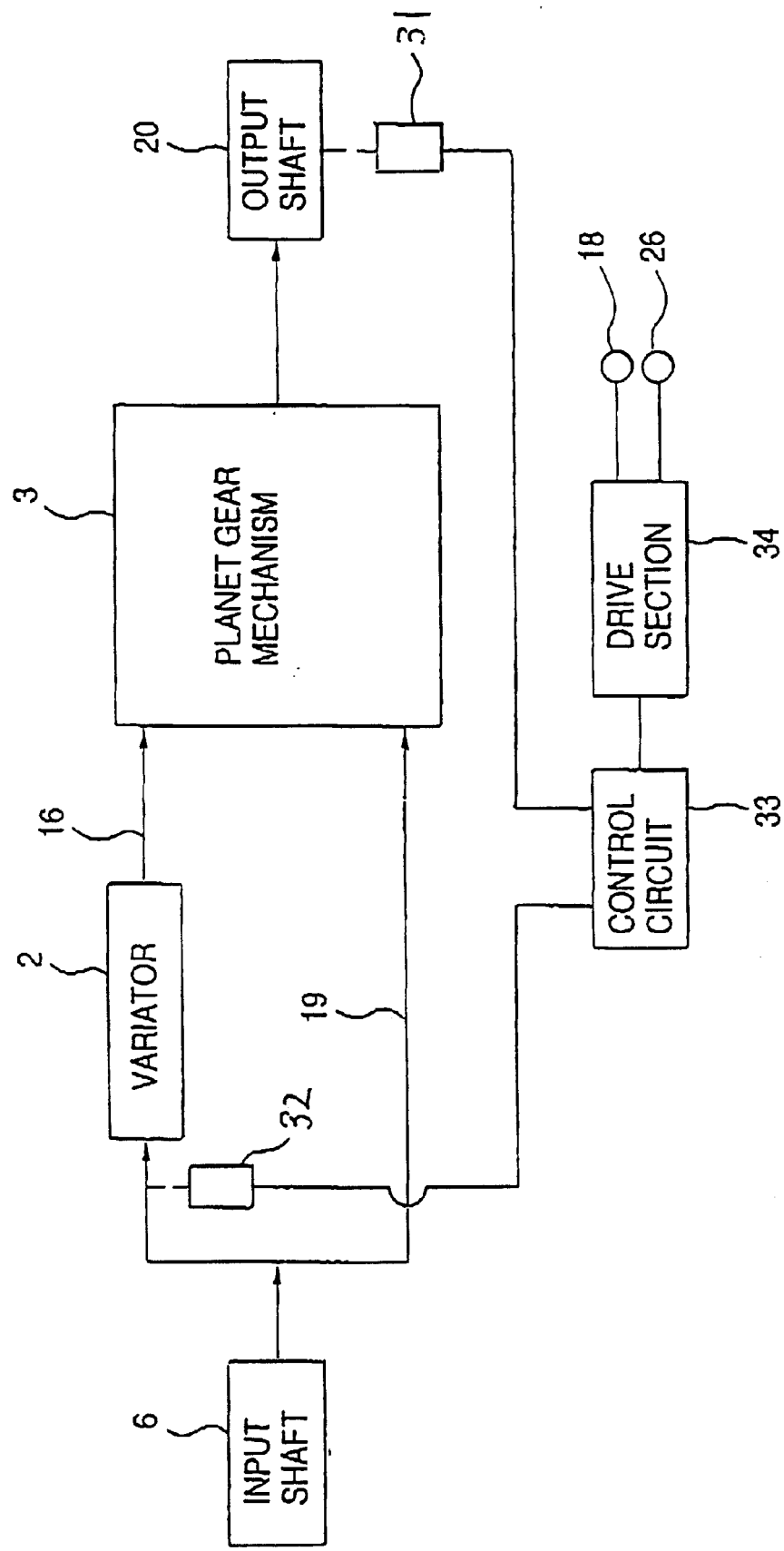
FIG. 7 is a block diagram showing a fifth embodiment of a continuously variable transmission according to the present invention.

FIG. 7 shows a fifth embodiment of the invention, in which parts corresponding functionally to those already described with reference to the first and second embodiments are therefore designated by the same reference numerals or characters. A specific feature of the fifth embodiment resides in that the first speed detecting sensor 31 in the second embodiment are provided at the output shaft 20. Thus, the first speed detecting sensor 31 detects the number of revolutions of the output shaft 20, and the second speed detecting sensor 32 detects the number of revolutions of the input disks 10a and 10b. The detection signals of the first speed detecting sensor 31 and the second speed detecting sensor 32 are applied to the control circuit 33. When those speeds (rpm) are equal to each other or substantially equal to each other, the control circuit 33 applies signals to the drive section 34 of the high speed clutch 18 and the low speed clutch 26, and a mode change is carried out.

The double cavity troidal-type continuously variable transmission has been described as the embodiment of the invention. However, the technical concept of the invention is applicable to a single cavity troidal-type continuously variable transmission (CVT), a half troidal CVT, or a full troidal CVT.

As was described above, the continuously variable transmission of the invention comprises the speed (rpm) ratio detecting member which detects the ratio of speed (rpm) of the first driving power transmitting system which is inputted through the variator to the planet gear mechanism to the second driving power transmitting system which is inputted directly (not through the variator) to the planet gear mechanism, and, when it is detected that the first and second driving power transmitting systems are substantially equal to each other in the ratio of speed, carries out the mode switching operation with the switching member. Hence, in the mode changing operation, the clutch connecting and disconnecting operation is achieved smoothly, and not only the clutch board is prevented from damage, but also the persons on the vehicle are prevented from being shocked.

What is claimed is:
1. A continuously variable transmission comprising:
   an input shaft rotated by a drive source;
   an output shaft for taking out a driving force attributing a rotation of said input shaft;
   a variator being arranged between said input shaft and said output shaft;
   a planet gear mechanism arranged between said input shaft and said output shaft;
   a switching member for switching a first mode in which a driving force circulation through said variator is carried out and a second mode in which a driving force circulation through said variator is not carried;
   a detecting member for detecting a ratio of speed of said output shaft, and a ratio of speed of a second driving force transmitting system which is inputted to said planet gear mechanism directly, not through said variator,
   wherein, when said detecting member detects a substantial coincidence in the ratios of speed of said output shaft and said second driving force transmitting system, said detecting member performs a mode switching operation using said switching member.
2. The continuously variable transmission according to claim 1, wherein said variator includes:
   a pair of input disks being confronted with each other, said input disks rotating in association with said input shaft;
   a pair of output disks being coaxially arranged between said input disks; and
   a second driving power transmitting shaft provided at a second end of said input shaft, and
   said detecting member includes:
   a first speed detecting sensor for detecting number of revolutions of said output shaft; and a second speed detecting sensor for detecting number of revolutions of said second driving power transmitting shaft.

3. The continuously variable transmission according to claim 2, wherein said planet gear mechanism includes:

a sun gear coupled with said output shaft;

a plurality of planet gears engaged with said sun gear;

a carrier engaging with said planet gears; and a ring gear engaging with said planet gears, and said switching member includes:

a low speed clutch located between said carrier and said ring gear; and a high speed clutch provided coupled to said second driving power transmitting shaft.

4. The continuously variable transmission according to claim 1, wherein said variator includes:

a pair of input disks being confronted with each other, said input disks rotating in association with said input shaft; and a pair of output disks being coaxially arranged between said input disks, and said detecting member includes:

a first speed detecting sensor for detecting number of revolutions of said output shaft; and a second speed detecting sensor for detecting number of revolutions of said input disks.

5. A continuously variable transmission used as an automobile transmission comprising:

an input shaft rotated by a drive source;

an output shaft for taking out a driving force attributing a rotation of said input shaft;

a variator being arranged between said input shaft and said output shaft, said variator including:
 a) a pair of input disks being confronted with each other, said input disks rotating in association with said input shaft, and
 b) a pair of output disks being coaxially arranged between said input disks in a loosely engaging state;

a loose engage shaft for connecting said output disks;

a first driving power transmitting shaft in association with said loose engaging shaft, through a first sprocket and a chain;

a second driving power transmitting shaft provided at a second end of said input shaft;

a planet gear mechanism arranged between said input shaft and said output shaft, said planet gear mechanism including:
 a) a sun gear coupled with said output shaft;
 b) a plurality of planet gears engaged with said sun gear,
 c) a carrier engaging with said planet gears, and
 d) a ring gear engaging with said planet gears;

a low speed clutch located between said carrier and said ring gear;

a high speed clutch provided coupled to said second driving power transmitting shaft;

a first speed detecting sensor for detecting number of revolutions of said output shaft; and a second speed detecting sensor for detecting number of revolutions of said second driving power transmitting shaft.

6. A continuously variable transmission used as an automobile transmission comprising:

an input shaft rotated by a drive source;

an output shaft for taking out a driving force attributing a rotation of said input shaft;

a variator being arranged between said input shaft and said output shaft, said variator including:
 a) a pair of input disks being confronted with each other, said input disks rotating in association with said input shaft, and
 b) a pair of output disks being coaxially arranged between said input disks;

a second driving power transmitting shaft provided at a second end of said input shaft;

a planet gear mechanism arranged between said input shaft and said output shaft, said planet gear mechanism including:
 a) a sun gear coupled with said output shaft,
 b) a plurality of planet gears engaged with said sun gear,
 b) a carrier engaging with said planet gears, and
 d) a ring gear engaging with said planet gears;

a low speed clutch located between said carrier and said ring gear;

a high speed clutch provided coupled to said second driving power transmitting shaft;

a first speed detecting sensor for detecting number of revolutions of said output shaft; and a second speed detecting sensor for detecting number of revolutions of said input disk.

* * * * *